United States Patent
Pulvermacher

(10) Patent No.: US 7,673,362 B2
(45) Date of Patent: Mar. 9, 2010

(54) WHEEL CLEANING APPARATUS FOR A WHEELCHAIR OR THE LIKE

(75) Inventor: Ronald J. Pulvermacher, Cottage Grove, WI (US)

(73) Assignee: Matrix Product Development, Inc., Cottage Grove, WI (US)

( * ) Notice: Subject to any disclaimer, the term of this patent is extended or adjusted under 35 U.S.C. 154(b) by 1547 days.

(21) Appl. No.: 10/896,649

(22) Filed: Jul. 22, 2004

(65) Prior Publication Data

US 2005/0015902 A1    Jan. 27, 2005

Related U.S. Application Data

(60) Provisional application No. 60/489,249, filed on Jul. 22, 2003.

(51) Int. Cl.
*B60S 3/00* (2006.01)

(52) U.S. Cl. .................... 15/53.4; 15/88.2; 15/88.3

(58) Field of Classification Search ............ 15/53.4, 15/53.1, 88.2, 88.3, DIG. 2, 256.5–256.52
See application file for complete search history.

(56) References Cited

U.S. PATENT DOCUMENTS

| | | | |
|---|---|---|---|
| 3,729,763 A | 5/1973 | Coley | |
| 4,233,703 A | 11/1980 | Clyne et al. | |
| 4,306,329 A * | 12/1981 | Yokoi | 15/319 |
| 4,926,520 A * | 5/1990 | Watson | 15/302 |
| 5,133,375 A | 7/1992 | Schinzing et al. | |
| 5,860,180 A | 1/1999 | Heise | |
| 2002/0004961 A1 | 1/2002 | Nishina | |

FOREIGN PATENT DOCUMENTS

JP     56060753 A  *  5/1981

* cited by examiner

*Primary Examiner*—Dung Van Nguyen
(74) *Attorney, Agent, or Firm*—Charles S. Sara, Esq.; Dewitt Ross & Stevens, S.C.

(57) ABSTRACT

A tire-cleaning device for a wheelchair or other wheeled device, such as a scooter, which includes a pair of rotatably-mounted rollers positioned to support at least one wheel of the wheelchair. A rotatably-mounted cleaning brush is positioned between the rollers. The rollers are activated in a direction opposite that to the brush such that the rollers and brush rotate in opposite directions causing the brush to rotate in a direction opposite the tire of the rotating wheel of the wheelchair in order to effect the best cleaning mode. Cleaning fluid is drawn to the tire of the wheelchair by the rotating brush.

8 Claims, 8 Drawing Sheets

WHEEL CLEANING APPARATUS FOR A WHEELCHAIR OR THE LIKE

CROSS-REFERENCE TO RELATED APPLICATIONS

This application claims priority under 35 USC §119(e) to U.S. Provisional Patent Application 60/489,249 filed 22 Jul. 2003, the entirety of which is incorporated by reference herein.

FIELD OF THE INVENTION

The present invention is directed to a tire- and wheel-cleaning apparatus for wheelchairs, scooters and other driven vehicles.

DESCRIPTION OF THE PRIOR ART

Providing a means for maintaining the cleanliness of the wheels or tires of a wheelchair or other scooters and motor-driven devices has always been an issue when the wheelchair operator enters a building from the outside. If the tires are dirty, they must be cleaned to prevent soiling of the carpeting and floors within the building. Machines for washing the wheels of wheelchairs and scooters are available. For example, U.S. Pat. No. 5,860,180 to Heise provides a tire-cleaning apparatus for wheelchairs comprising two pairs of rollers and a variety of cleaning brush-like devices. U.S. Pat. No. 5,133,375 to Schinzing, et al., provides a washer for a conventional wheelchair which has a washing chamber within an enclosure and a fluid-driven rotatable washer arm with nozzles for directing cleaning and rinsing fluids to the wheelchair. U.S. patent Publication 2002/0004961 to Nishina provides a wheel-cleaning apparatus for a wheelchair comprising a pair of cleaning brushes rotating over a ramp-like structure.

SUMMARY OF THE INVENTION

The present invention is directed to a wheel washer for a wheelchair primarily intended to clean the wheels of two-, three- and four-wheel scooters and wheelchairs. A tire cleaning device for a wheeled vehicle comprises a pair of rotatably mounted rollers positioned to support at least one wheel of the wheelchair; a rotatably mounted cleaning brush positioned between the rollers; and means to rotate the rollers and brush such that the rollers and brush rotate in opposite directions.

More specifically, the present invention is directed to a tire cleaning device for a wheelchair comprising a platform, which includes a pair of rotatably mounted rollers positioned to support at least one wheel of the wheelchair; a rotatably mounted cleaning brush positioned between the rollers, wherein the rollers and brush are connected by a series of gears to enable the brush to rotate in a direction opposite to that of the rollers; means to rotate the rollers and brush such that the rollers and brush rotate in opposite directions; a washing tray in association with the brush, wherein the washing tray comprises a base, four sides and a top edge and wherein the washing tray is situated such that at least a portion of the cleaning brush is situated over and below the top edge of the washing tray; and means to control the operation of the device.

The present invention is specifically directed to a tire-cleaning device for a wheelchair comprising a pair of rotatably-mounted rollers positioned to support at least one wheel of the wheelchair, a rotatably-mounted cleaning brush positioned between the rollers and means to rotate the rollers and the brush such that the rollers and brush rotate in opposite directions and further such that the brush rotates in a direction opposite to the turning direction of the wheels of the wheelchair.

The unit can be placed in a pedestrian walkway or flush mounted in the floor of a home. The present invention advantageously accommodates wheelchairs and other wheeled devices, such as three- or four-wheeled scooters. It can be used in a variety of venues, such as nursing homes, clinics, stores and homes. It is designed to be installed permanently or temporarily virtually anywhere the user chooses. The washer will eliminate the tracking of soil throughout the house or facility, thereby extending flooring life and maintaining a cleaner living environment.

Advantageously, the cleaning device of the present invention does not require spray nozzles, but rather a single cleaning brush that is partially submerged in a solution tray that when rotated drags cleaning solution or water onto the wheel or wheels to be cleaned. The device further uses a filling valve and overflow drain, thereby eliminating any floats or level sensors to maintain a water level. The apparatus can be adapted to different dimensions of tires.

The objects and advantages of the invention will appear more fully from the following detailed description of the preferred embodiment of the invention made in conjunction with the accompanying drawings.

DETAILED DESCRIPTION OF THE INVENTION

Figure 1:
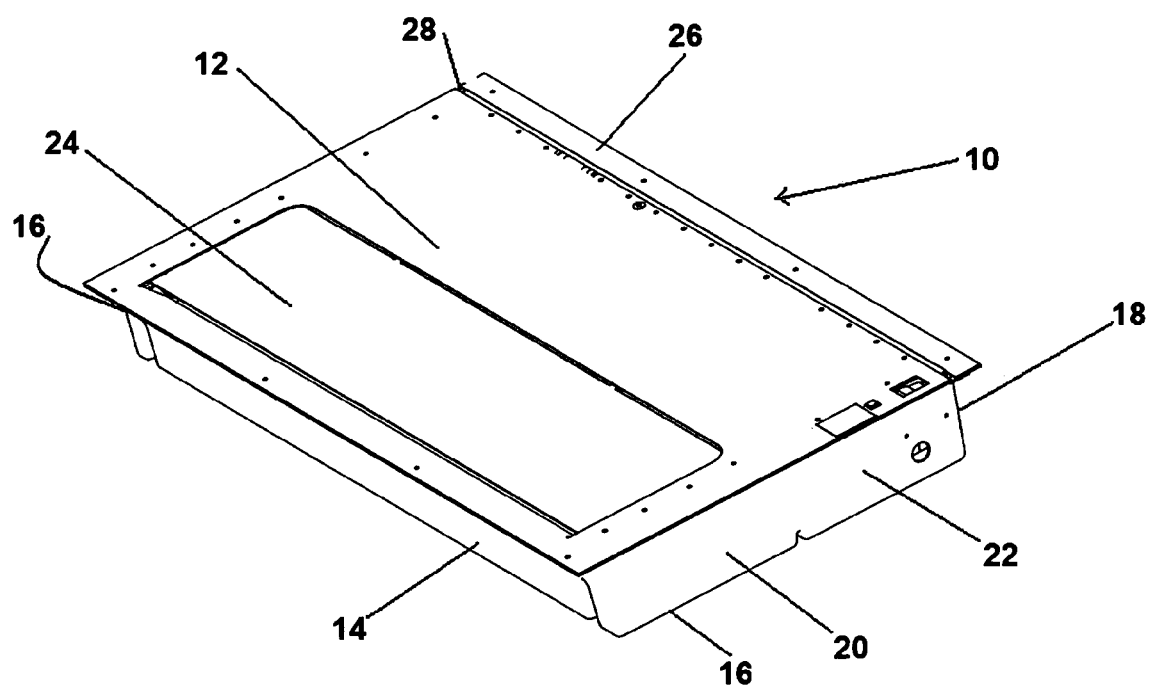
FIG. 1 is a perspective view of the cleaning platform of the present invention.

Referring now to FIG. 1, there is illustrated the cleaning platform or unit 10, designed to be placed before a door or entranceway of an establishment. The platform 10 can be permanently installed directly into the ground, cement or other surface such that the upper surface level of the platform 10, defined by a cover panel 12, is flush with the surface area of the ground. Alternatively, the platform 10 can be temporarily placed at any location and accessed by means of ramps (not shown) located at its forward and rearward sections. The platform 10 includes a base 13 having a front panel 14, two side panels 16 and a rear panel 18, as illustrated in FIG. 1.

Figure 3:
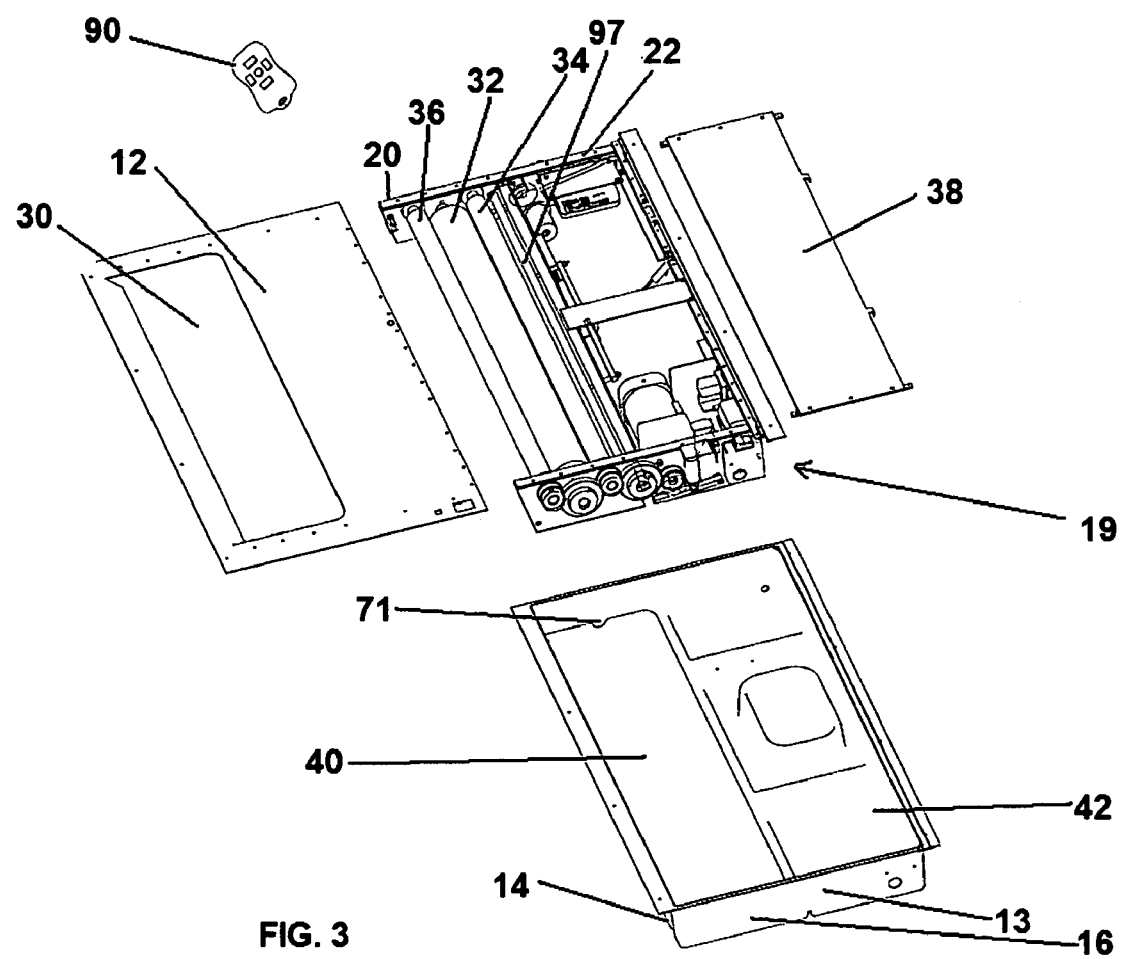
FIG. 3 is an exploded perspective view of the cleaning platform of FIG. 1.

As illustrated more clearly in FIG. 3, the platform 10 is comprised of two sections 20, 22. Section 20, the front section, houses the cleaning apparatus which will be described shortly. Section 22, the rear section, houses the motors and other instruments, which will also be further described. The cover 12 includes a retractable horizontal door 24 designed to cover the cleaning instruments when not in use, thereby allowing pedestrian traffic to walk directly over the platform 10. The cover 12 also includes a hinge plate 26 connected to the panel 12 by means of a piano-type hinge 28 for mounting the platform unit 10 to a solid surface.

Figure 2:
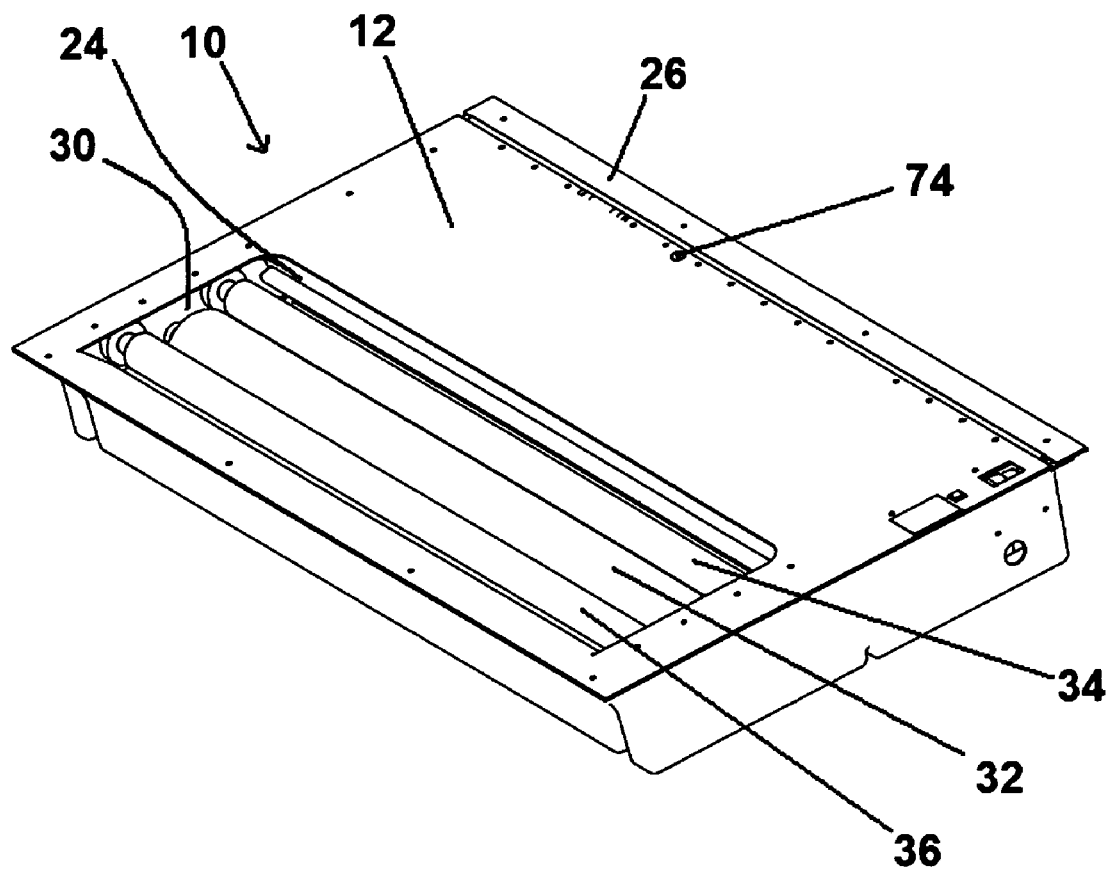
FIG. 2 is a perspective view of the cleaning platform of FIG. 1 showing the door opened to reveal the cleaning unit.

Reference is now made to FIG. 2 which illustrates the platform 10 in which the door 24 has retracted rearwardly beneath the cover 12 to reveal an opening 30, thereby exposing the cleaning apparatus. Within the opening 30 is a rotatably-mounted cylindrical cleaning brush 32 of approximately the same length as the width of the platform 10. Extending parallel to the brush 32 are a pair of rotatably-mounted rollers 34, 36 which are mounted on either side of the brush 32. The brush 32 is designed to be either a wet or dry brush, known to the art, which can comprise a choice of bristles to tailor to any particular cleaning job. In addition, the brush 32 can be replaced by a cleaning pad depending on its needs. The rollers 34, 36 can be made of steel, aluminum, plastic or other materials designed to hold the weight of a wheeled vehicle 61 (partially illustrated in FIG. 6). In addition, the rollers 34, 36 can include surface hatchings to provide traction for the wheels, or they can be provided with a rubber or other skid-resistant coating.

Reference is now made to FIGS. 3 and 4 to illustrate the internal workings of the platform 10. FIG. 3 shows, in exploded perspective view, the platform 10, including the cover 12, the base 13 and the operating unit 19 comprising the first, front section 20 and the second, rear section 22. In addition, there is illustrated an access panel 38 designed to be placed between the operating unit 19 and the cover 20 and above the second section 22. The base 13 is characterized by a washing tray 40 which is designed to be placed immediately underneath the brush 32 and rollers 34, 36. The base 13 is further defined by an area 42 for receiving the working elements of the platform 10. Illustrated in the area 42 is the detergent reservoir 72 which will be described later.

Figure 4A:
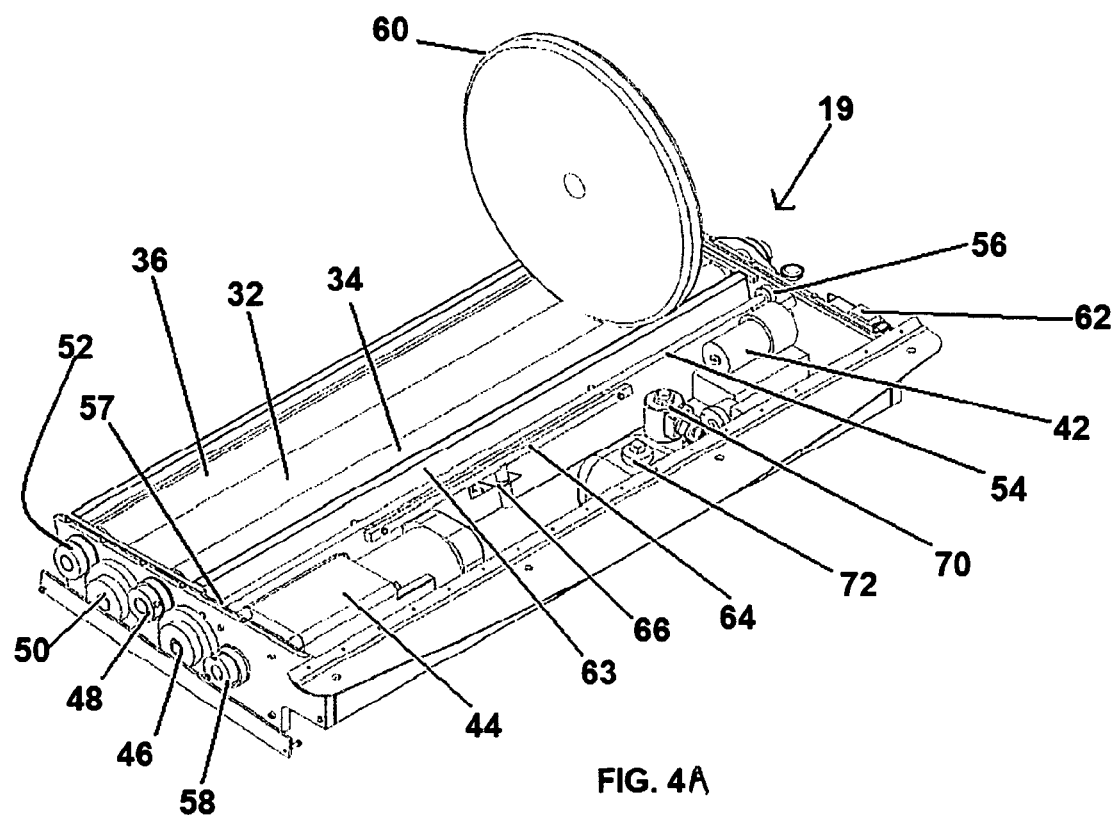
FIG. 4A is a perspective view of the operating unit within the cleaning platform.
Figure 4B:
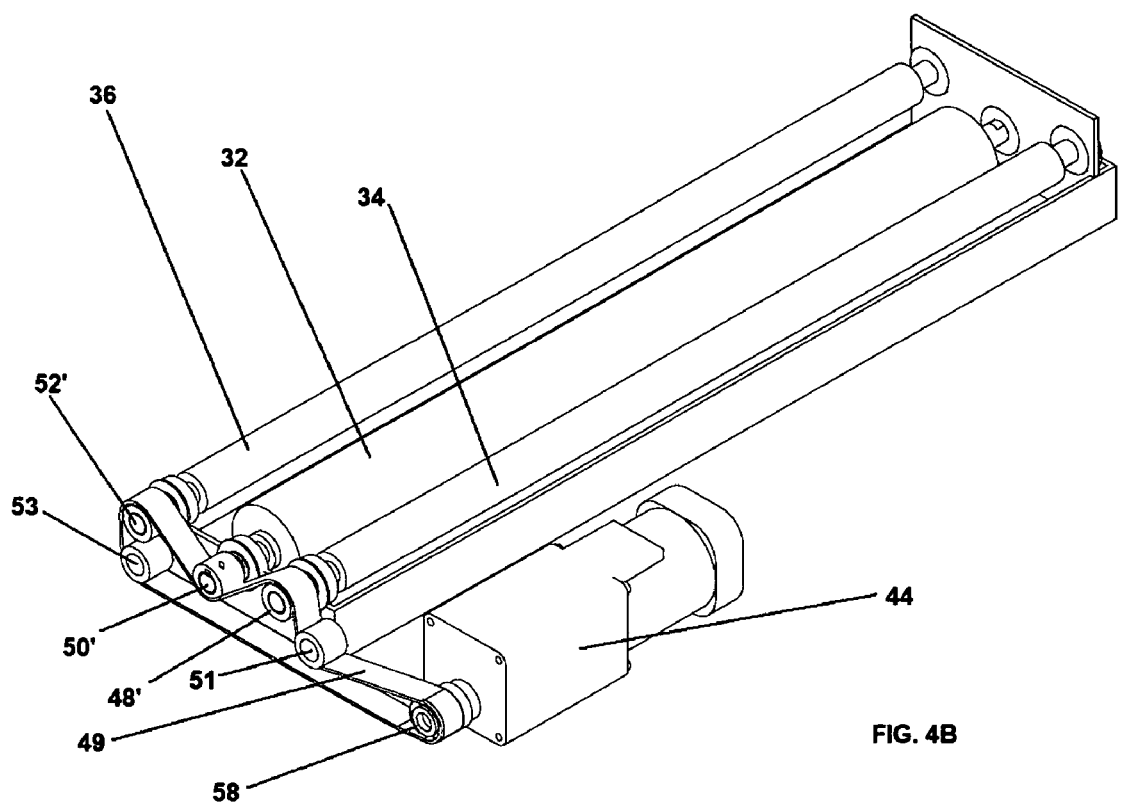
FIG. 4B is a perspective view of an alternative embodiment of the operating unit of the present invention illustrating a belt driven system.

Referring now more specifically to FIG. 4A, the operating unit 19 of the platform 10 is defined by a motor 42 which operates to slide the door 24 in an open and closed position, thereby exposing the rollers 34, 36 and the brush 32. In addition, there is a second motor 44 which drives the rollers 34, 36 by means of a one-way motor clutch 58 and a set of drive gears 46, 48, 50, 52. Both motors 42, 44 can be standard electrically-operated 12 volt DC motor, known to the art.

The motor 42 activates the gear system by means of a drive shaft 54 connected at the motor end by a gear rack 56 and at the operating end by gear 57. After the motor 42 opens the horizontal door 24, the motor 44 is used to activate the gear system by driving gear 46, which acts in concert with the remaining gears 48, 50, 52 to operate the rollers 34, 36 and brush 32. Each of the gears 46, 48, 50, 52 have teeth which interact with each other, such that the driving force of gear 46, which is activated by the motor 44 and one way clutch 58, operates the gear 48 of the first roller 34 which in turn operates the gear 50 of the brush 32 which then operates the gear 52 of the second roller 36. A locking pawl 96 operated by a solenoid 94 works to prevent rotation of gear 46 thereby preventing rotation of roller 48, brush 50 and roller 52.

It is also within the scope of the present invention to use other means to rotate the rollers 34, 36 and brush 32, such as belts, chains and sprockets. For example, referring to FIG. 4B, a belt driven operation in illustrated in which the gears 48, 50, 52 are replaced by belt rollers 48', 50', 52' and are urged into motion by means of a friction belt 49 operated by means of the motor 44 and clutch 58. Guide rollers 51, 53 create the necessary tension on the belt 49 to enable the belt 49 to drive belt rollers 48', 50', 52'.

In a preferred embodiment, the motor 42 includes a motor drive circuit with current-limiting powers for opening and closing the door 24 in order to limit damage to foreign objects that may be caught in the door opening 30 as it is closing.

The one-way clutch 58 allows the roller drive motor 44 to engage the rollers 34, 36 to rotate in a manner opposite the rotational direction of the brush 32 in order to provide superior cleaning to the tire 60 of a wheelchair 61 or other motorized apparatus. Optionally, the brush 32 can turn the same direction as the wheel 60 being cleaned as long as the brush 32 turns at a faster rate than the wheel 60. The one-way clutch 58 allows the roller drive motor 44 to engage the rollers 34, 36 to clean the tire 60 of a non-driven axle of the device being cleaned such as an electric wheel chair, scooter or manually operated wheel chair. Switch 62 disengages all power from the cleaner for servicing and repairs.

A center support divider 63 is positioned between the first roller 34 and the rear section 22 of the operating unit 19. A safety bar 97 is connected to the divider 63 by means of a screw, spacer and proximity sensor bar 64. The proximity sensor 66 senses the presence of foreign objects and acts to stop the motor 44 if a foreign object gets caught between the roller 34 and the center support divider 63 to prevent damage. Thus, the unit 10 will shut down if a foreign object is detected in the roller 34.

Referring back to FIG. 3, the washing tray 40 is designed to be placed directly beneath the brush 32. A water valve 70 and overflow drain 71 provide an automatic fill and drain capability to supply fresh cleaning solution to the washing tray 40. The overflow drain 71 maintains the cleaning solution level in the washing tray 40 sufficient to allow the cleaning brush 32 to drag the cleaning solution up against the wheel 60 or wheels to be cleaned. The water valve 70 and overflow drain 71 thereby eliminate the need for floats or level sensors to maintain a proper fluid level. A water channel in base 13 directs the detergent solution to a drain hose (not shown).

A detergent reservoir 72 is placed in the rear section 22 of the operating unit 19 and provided with a fill tube and level dipstick which can be accessed through the cover 12 of the unit 10 by means of portal 74, illustrated in FIG. 2. Optionally, detergent can either be siphoned into a water stream via the water valve 70 or pumped directly into the washing tray 40. Preferably, a detergent pump (not shown) is provided which is mechanically actuated by the opening motion of the door 24.

Figure 5:
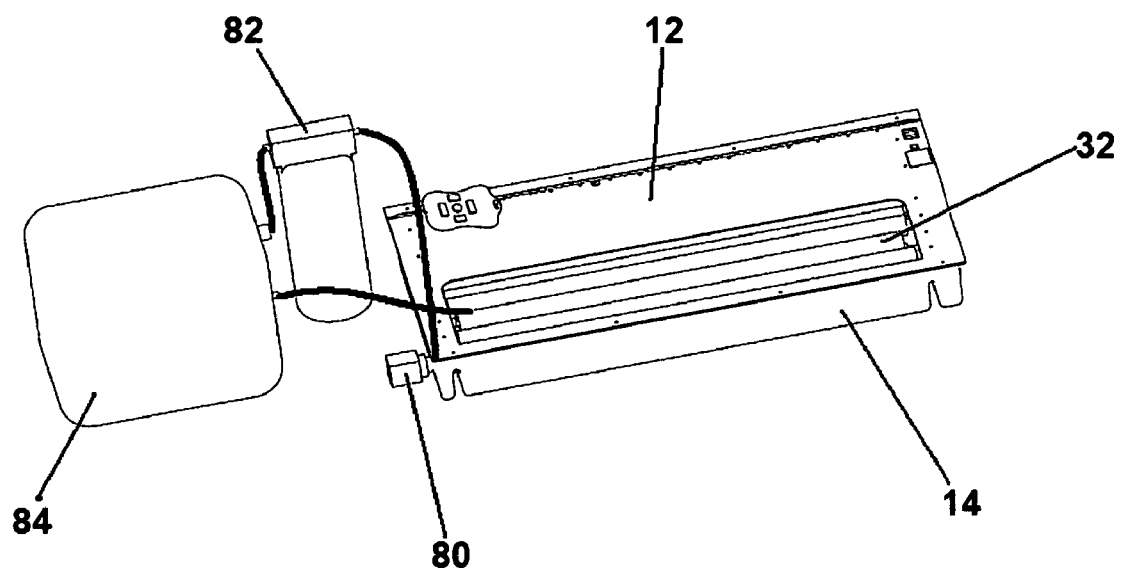
FIG. 5 is a perspective view of an optional embodiment of the present invention for recirculating and filtering the cleaning solution.

As illustrated in FIG. 5, an optional recirculating pump 80, filter 82, and detergent solution reservoir 84 can be attached to the platform 10 to clean the fluid in a closed reservoir solution. The recirculating pump 80, filter 82 and reservoir 84 act to filter the cleaning solution and thereby eliminate the need for a filling valve, siphon or detergent pump and a pressurized water inlet. This permits the use of an anti-freezing solution where the washer is installed in cold climates.

To operate, the entire system may be operated by a control system which operates the door 24 and the washer unit. The control system may be a series of pedestals (not illustrated), which switches the tire cleaning apparatus on and off and operates the same by way of an operating console which can be reached from a wheelchair.

Alternatively, a wireless remote control 90, illustrated in FIG. 3, can be used to open and close the door 24 and power the brush 32. The control 90 can be in the form of a key fob. The control 90 advantageously eliminates the need for several control panels that would be required to operate the cleaner to first open the access door 24, operate the cleaning brush 32, lock the rollers 34, 36 from rotating, and finally close the access door 24 covering the rollers 34, 36 and cleaning brush 32.

In addition, a timing device 91 can be used to control the time of operation. If the axle of the wheelchair is a non-driven axle, a second button can be actuated to turn on a timer that activates the motor 44 to rotate the roller pairs 34, 36 and cleaning brush 32 which are in contact with the wheel 60 or wheels to be cleaned.

Figure 6:
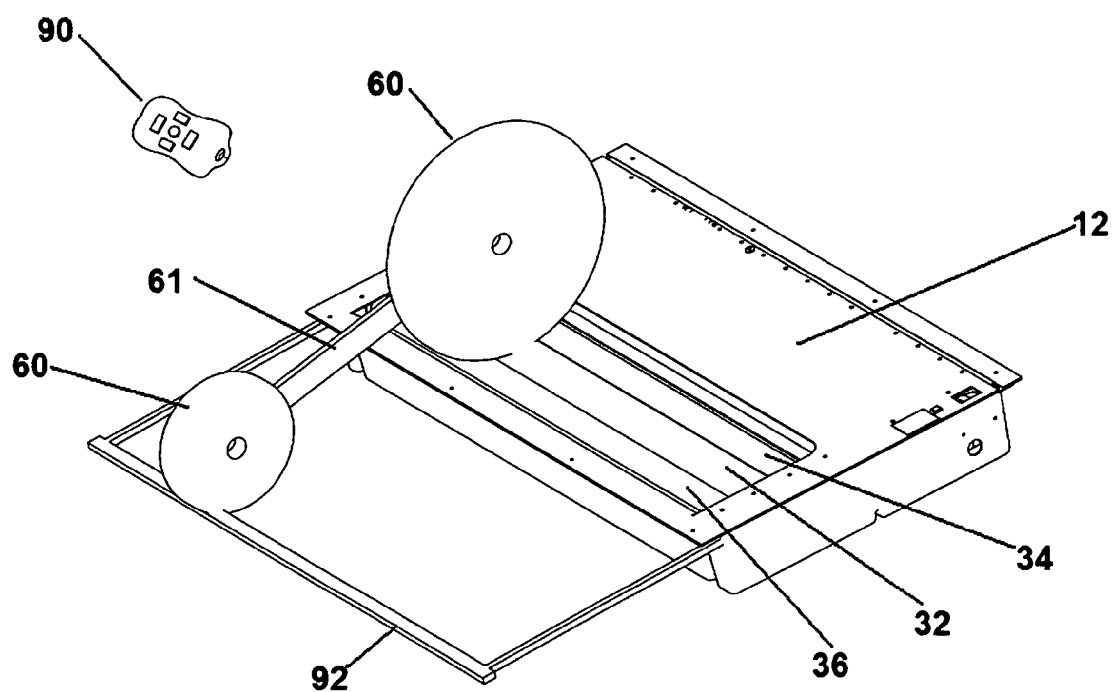
FIG. 6 is a perspective view of the cleaning platform showing the platform in use.
Figure 7:
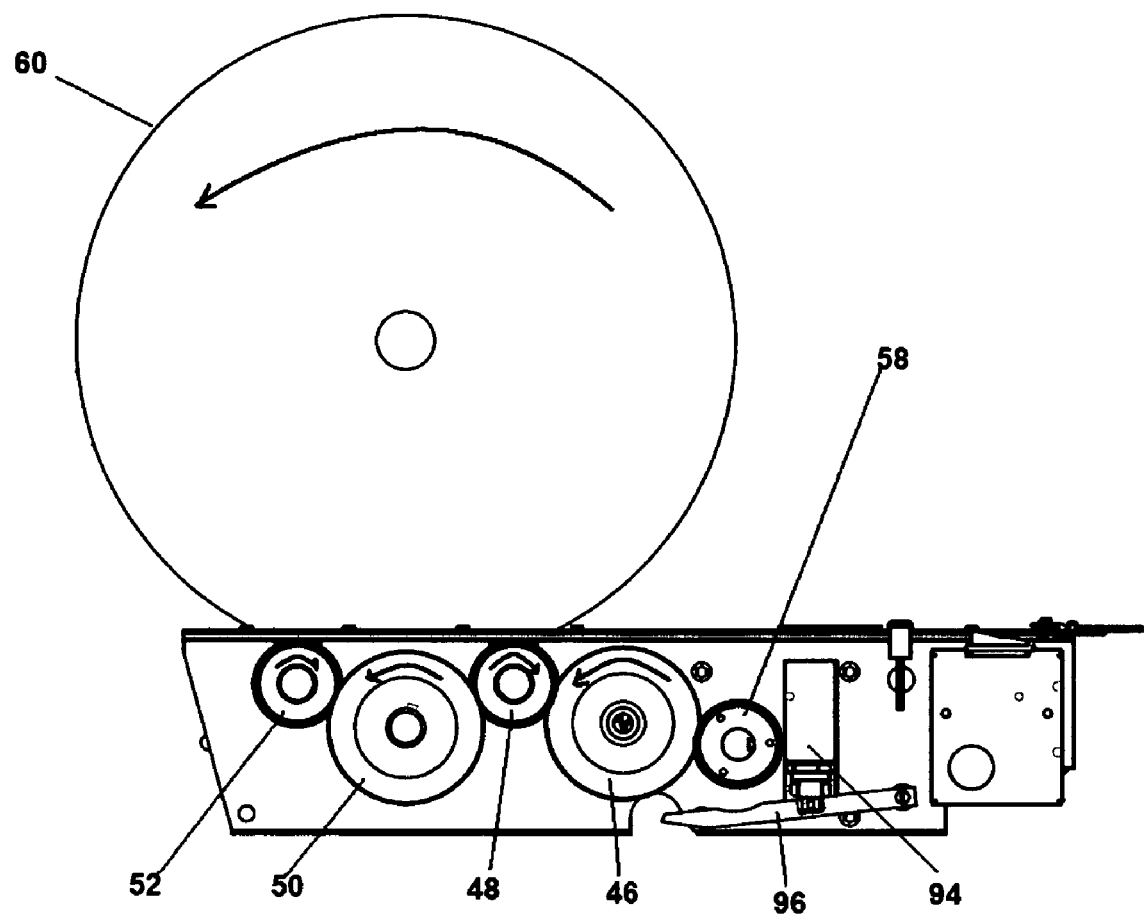
FIG. 7 is a side elevated view of the operating unit of the present invention illustrating the action of the gears.

Reference is now made to FIGS. 6 and 7 to illustrate the operation of the cleaning unit 10. When in operation, the wheelchair 61, partially illustrated in FIG. 6, which includes wheels 60, is placed before the cleaning platform 10. Prior to rolling the wheelchair 61 onto the platform 10, door 24 is activated to roll under the cover 12. Activation can be initiated by means of the remote control 90. The wheelchair 61 is then rolled such that the front wheels 60 of the wheelchair 61 are placed on the brush 32 and rollers 34, 36. As a precaution, a wheel bump 92 may be either permanently or temporarily affixed to the platform 10 and can be adjusted to fit against non-driven wheels to help keep the driven axle positioned on the rollers 34, 36 while the driven axle is turning to power the cleaning brush 32.

The operation of the Platform 10 will now be described. Prior to operation, the water valve 70 is activated to fill the washing tray 40 with cleaning solution, generally fresh water, to a level not exceeding the opening of the washing tray but such that the washing brush 32 is partially immersed. Optionally, detergent can be either siphoned into the fluid stream or pumped into the washing tray 40 by means of the pump connected to the detergent reservoir 72. An overflow drain maintains a water level sufficient to allow the cleaning brush 32 to drag cleaning solution up against the wheel or wheels 60 to be cleaned. As discussed previously, the filling valve and overflow drain 70 eliminate any floats or level sensors to maintain a water level. The optional recirculating pump 80, filter 82 and reservoir 84 can be used to clean the water in the closed reservoir system.

In operation, the horizontal door 24 is motorized to slide open exposing the roller pairs 34, 36 and cleaning brush 32. The controls necessary to activate the door and washer can be either a series of pedestals or the wireless remote control 90 as discussed previously. Once the door 24 is opened, the wheelchair 61 is moved onto the front section 20 above the brush unit 32 and washing tray 40, thereby placing the axle of the wheel 60 over the roller pair 34, 36 and brush 32. If the axle of the wheelchair 61 is a non-driven axle on the item to be washed, a second control button may be actuated to turn on the timer that activates the motor 44 that rotates the roller pairs 34, 36 and cleaning brush 32 that is in contact with the wheel or wheels 60 to be cleaned.

The motor 44 drives the rollers 34, 36 by means of the one-way clutch 58 and the set of drive gears 46, 48, 50, 52 as follows. The motor 42 activates drive shaft 54 by means of rotating gear rack 56 to move the door 24. Operating gear 46 is further controlled by means of the solenoid 94 and latching pawl 96. For a non-motorized wheelchair 61, in which the axle is not self-driven, the motor 44 will operate to rotate the operating gear 46. As one means of operation, the one way clutch 58 and the connected gear 46 will be activated to rotate in a counterclockwise position as illustrated by the arrow on gear 46. Gear 46 then interacts with gear 48, which is integrally connected with first roller 34 to drive first roller 34 in a clockwise manner as illustrated by the arrow on gear 48. Gear 48 then acts upon gear 50, which is integrally connected with the cleaning brush 32 to rotate the cleaning brush 32 in a counterclockwise rotation as illustrated by the arrow on gear 50. Gear 50 then acts upon gear 52 which is integral with the second roller 36 to operate the second roller 36 in a clockwise position as illustrated by the arrow on gear 52. In this manner, the rollers 34, 36 are driven in the same clockwise direction. Because the rollers 34, 36 act to rotate the non-driven wheel 60 of the wheelchair 61, the direction of the wheel 60 will then be in counterclockwise manner as illustrated by the arrow on the wheel 60. Therefore, the direction of the wheel 60 will be opposite to that of the rotating brush 32 to effect the best cleaning power on the wheel 60.

After the timer 91 completes its timing cycle, the operator can move the wheelchair 61 forward such that the next set of wheels 60 is rolled onto the roller pair 34, 36 to repeat the entire process.

If the wheelchair 61 is a motorized version and the axle is a driven axle powered by the chair 61, the operator can rotate the wheel or wheels 60 to be cleaned while the wheels 60 sit on top of the roller pair 34, 36. In this manner, the motor 44 is not used and the clutch 58 deactivates the motor 44, thereby allowing the roller pairs 34,36 and brush 32 to operate freely. The wheels 60 of the wheelchair 61 sit on top of the roller pair 34, 36, thereby spinning in place and rotating the roller pair 34, 36 and cleaning brush 32. After the wheel or wheels 60 are cleaned, the operator reverses the direction of the wheel or wheels 60 and backs off the roller pair 34, 36 or presses a button on the wireless remote 90 to activate the solenoid 94 that engages latching pawl 96 to prevent the rollers 34 and 36 from rotation allowing the wheel chair 61 to drive forward and off the rollers 34 and 36.

Finally the door 24 is closed over the operating unit 19, for example, by a fourth control button on the remote control 90. In this manner, the rollers 34, 36 and cleaning brush 32 are covered. The wheeled device 61 can then roll over the platform 10 and pedestrians can walk over the entire platform 10 when not in use.

Preferably, a drying rug is placed around the cleaning unit 10 to remove the residual moisture from the wheels.

In a preferred mode, the dimensions of the cleaning platform 10 will have a length of approximately 36 inches, a width of approximately 20 inches and a height of approximately 4.5 inches (91.5 cm×51 cm×11.5 cm). The unit will be designed to fit into an opening within a floor approximately 35½ inches by 18 inches (90.2 cm×44 cm). The unit will have a load-bearing capacity in the range of 770 pounds (350 kg). The preferred cleaning period is adjustable but is generally 20 seconds per axle. The preferred unit can accommodate wheels having a diameter from 4 inches (10 cm) to 28 inches (71 cm). The width of the track is preferably around 31 inches (79 cm). The power input is preferably 115 VAC, 60 hertz (Hz). Optionally, a power input of 220 VAC and 50 Hz or 12-24 VDC can be utilized.

The water input of the preferred unit is provided by a ¼-inch (0.64-cm) flexible copper tubing. The drain outlet is provided by a ½-inch hose nipple. The capacity of the washing tray is approximately 5 quarts (4.75 liters).

The preferred temperature range of the washing fluid is between 32 and 110 degrees F. (0 to 45 degrees C.) or −10 to 110 degrees F. (−23 to 45 degrees C.) using anti-freeze solution.

It is understood that the invention is not confined to the particular construction and arrangement of parts herein illustrated and described, but embraces such modified forms thereof as come within the scope of the following claims. For example, the dimensions of the platform 10 and its individual pieces can be customized to accommodate other scenarios and other sized wheeler vehicles, including two-wheeled vehicles.

What is claimed is:

1. A tire cleaning apparatus for a wheelchair or scooter having at least one driven wheel and one non-driven wheel, comprising:
   a. a first rotatable roller;
   b. a second rotatable roller positioned parallel with the first rotatable roller and separated therefrom, wherein the first rotatable roller and the second rotatable roller are positioned to support the driven wheel and the non-driven wheel of the wheelchair or scooter;
   c. a rotatable cylindrical cleaning brush positioned parallel with the first rotatable roller and with the second rotatable roller, between the first rotatable roller and the second rotatable roller, and beneath a common plane of the first rotatable roller and the second rotatable roller;
   d. a washing tray having a top edge and positioned with respect to the rotatable cylindrical cleaning brush such that at least a portion of the rotatable cylindrical cleaning brush is positioned within the washing tray below the top edge of the washing tray and such that the rotatable cylindrical cleaning brush is partially submerged in a washing fluid in the washing tray and the washing fluid is dragged upward by the rotatable cylindrical cleaning brush against a driven wheel or a non-driven wheel supported on the first rotatable roller and the second rotatable roller when the rotatable cylindrical cleaning brush is rotated;
   e. a motor operationally coupled to at least one of the first rotatable roller or the second rotatable roller and the rotatable cylindrical cleaning brush; and
   f. a controller to control operation of the motor for rotation of the at least one of the first rotatable roller or the second rotatable roller and the rotatable cylindrical cleaning brush by the motor to clean a non-driven wheel supported on the first rotatable roller and the second rotatable roller;
   wherein the apparatus is structured such that rotation of the at least one of the first rotatable roller or the second rotatable roller in a first direction by a driven wheel supported on the first rotatable roller and the second rotatable roller causes rotation of the rotatable cylindrical cleaning brush in an opposite second direction thereby to clean the driven wheel.

2. The apparatus of claim 1 comprising additionally a clutch coupled between the motor and the at least one of the first rotatable roller or the second rotatable roller and the rotatable cylindrical cleaning brush and adapted to disconnect the motor from the at least one of the first rotatable roller or the second rotatable roller and the rotatable cylindrical cleaning brush when the at least one of the first rotatable roller or the second rotatable roller is driven by the driven wheel.

3. The apparatus of claim 1 further including drive gears coupled to the first rotatable roller, to the second rotatable roller, to the rotatable cylindrical cleaning brush and to each other such that rotation of the at least one of the first rotatable roller or the second rotatable roller in the first direction causes rotation of the rotatable cylindrical cleaning brush in the opposite second direction.

4. The apparatus of claim 1 further including belt rollers coupled to the first rotatable roller, to the second rotatable roller, and to the rotatable cylindrical cleaning brush and at least one friction belt coupling together the belt rollers such that rotation of the at least one of the first rotatable roller or the second rotatable roller in the first direction causes rotation of the rotatable cylindrical cleaning brush in the opposite second direction.

5. The apparatus of claim 1 wherein the controller includes a wireless remote control.

6. The apparatus of claim 1 further comprising a platform containing the first and second rotatable rollers and the rotatable cylindrical cleaning brush.

7. The apparatus of claim 6 wherein the platform includes the washing tray, wherein the washing tray further comprises a base and four sides.

8. The apparatus of claim 1 further comprising a re-circulating pump, a filter and a fluid reservoir to clean the washing fluid in the washing tray.

* * * * *